(12) United States Patent
Kasuya

(10) Patent No.: US 9,354,680 B2
(45) Date of Patent: May 31, 2016

(54) IMAGE FORMING APPARATUS, CONTROL METHOD FOR IMAGE FORMING APPARATUS, AND STORAGE MEDIUM HAVING A FIRMWARE UPDATE FUNCTION

(71) Applicant: CANON KABUSHIKI KAISHA, Tokyo (JP)

(72) Inventor: Kenji Kasuya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 13/752,869

(22) Filed: Jan. 29, 2013

(65) Prior Publication Data

US 2013/0198507 A1    Aug. 1, 2013

(30) Foreign Application Priority Data

Feb. 1, 2012    (JP) ................................. 2012-019898

(51) Int. Cl.
*G06F 1/24* (2006.01)
*G06F 9/445* (2006.01)

(52) U.S. Cl.
CPC .. *G06F 1/24* (2013.01); *G06F 8/65* (2013.01); *G06F 8/665* (2013.01); *G06F 9/44505* (2013.01)

(58) Field of Classification Search
CPC ............. G06F 8/65; G06F 8/665; G06F 1/26; G06F 1/24
USPC ........................................................ 713/300
See application file for complete search history.

(56) References Cited

U.S. PATENT DOCUMENTS

| | | | |
|---|---|---|---|
| 2005/0132091 A1* | 6/2005 | Shibata | G06F 8/65 710/4 |
| 2008/0005733 A1* | 1/2008 | Ramachandran | G06F 8/65 717/168 |
| 2008/0258758 A1* | 10/2008 | Kaizu | 326/38 |
| 2008/0301751 A1* | 12/2008 | Naito | 725/139 |
| 2008/0320110 A1* | 12/2008 | Pathak | G06F 11/1433 709/220 |
| 2009/0241099 A1* | 9/2009 | Lee | G06F 8/65 717/168 |
| 2010/0082847 A1* | 4/2010 | Yasui | G06F 8/65 710/15 |
| 2010/0175062 A1* | 7/2010 | Kim | G06F 8/65 717/173 |
| 2010/0186007 A1* | 7/2010 | Jeong | G06F 8/60 717/170 |
| 2012/0060151 A1* | 3/2012 | Oh et al. | 717/170 |
| 2012/0144380 A1* | 6/2012 | Rabeler | G06F 8/68 717/170 |
| 2013/0179871 A1* | 7/2013 | Nagao et al. | 717/170 |

FOREIGN PATENT DOCUMENTS

JP    2005-050095 A    2/2005

* cited by examiner

*Primary Examiner* — Thomas Lee
*Assistant Examiner* — Volvick Derose
(74) *Attorney, Agent, or Firm* — Canon U.S.A., Inc. IP Division

(57) ABSTRACT

An image forming apparatus includes an update unit configured to execute firmware update processing, a storage unit configured to store information relating to a change in a setting value of the image forming apparatus produced by the firmware update processing, a selection unit configured to select a specific update history entry from a firmware update history, and a display unit configured to display information relating to the change in the setting value produced by the firmware update processing corresponding to the specific update history entry selected by the selection unit based on the information stored in the storage unit.

7 Claims, 14 Drawing Sheets

FIG.6A

```
device_settings   common_settings   common_setting_a=1
                                    common_setting_b=0
                                    common_setting_c=0 copy_settings     copy_setting_a=0
                                    copy_setting_b=0
                                    copy_setting_c=1 print_settings    print_setting_a=1
```

FIG.6B

```xml
<?xml version="1.0" encoding="utf-8" ?>
<device_settings>
   <common_settings>
      <common_setting_a>1</common_setting_a>
      <common_setting_b>0</common_setting_b>
      <common_setting_c>0</common_setting_c>
   </common_settings>
   <copy_settings>
      <copy_setting_a>0</copy_setting_a>
      <copy_setting_b>0</copy_setting_b>
      <copy_setting_c>1</copy_setting_c>
   </copy_settings>
   <print_settings>
      <print_setting_a>1</print_setting_a>
   </print_settings>
         ⋮
</device_settings>
```

FIG.7A

```
device_settings  common_settings  common_setting_a=1
                                  common_setting_b=0 copy_settings    copy_setting_a=1
                                  copy_setting_b=0
                                  copy_setting_c=1 print_settings   print_setting_a=1
                                  print_setting_b=0
                                  print_setting_c=0
```

FIG.7B

```xml
<?xml version="1.0" encoding="utf-8" ?>
<device_settings>
    <common_settings>
        <common_setting_a>1</common_setting_a>
        <common_setting_b>0</common_setting_b>
    </common_settings>
    <copy_settings>
        <copy_setting_a>1</copy_setting_a>
        <copy_setting_b>0</copy_setting_b>
        <copy_setting_c>1</copy_setting_c>
    </copy_settings>
    <print_settings>
        <print_setting_a>1</print_setting_a>
        <print_setting_b>0</print_setting_b>
        <print_setting_c>0</print_setting_c>
    </print_settings>
        ⋮
</device_settings>
```

FIG.8

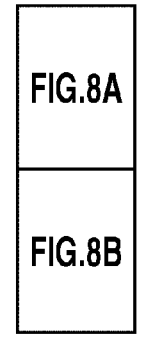

FIG.8A

```xml
<?xml version="1.0" encoding="utf-8" ?>
<prev_firmware_version>10.01</prev_firmware_version>
<cmt_firmware_version>11.01</cmt_firmware_version>
<add_settings>
  <diff>
    <device_settings>
      <print_settings>
        <print_setting_b>
          <diff_info>
            <prev_value></prev_value>
            <cmt_value>0</cmt_value>
            <disp_id>1276</disp_id>
            <button_id>3</button_id>
          </diff_info>
        </print_setting_b>
      </print_settings>
    </device_settings>
  </diff>
  <diff>
    <device_settings>
      <print_settings>
        <print_setting_c>
          <diff_info>
            <prev_value></prev_value>
            <cmt_value>0</cmt_value>
            <disp_id>1358</disp_id>
            <button_id>2</button_id>
          </diff_info>
        </print_setting_c>
      </print_settings>
    </device_settings>
  </diff>
</add_settings>
```

FIG.8B

```xml
<del_settings>
  <diff>
    <device_settings>
      <common_settings>
        <common_setting_c>
          <diff_info>
            <prev_value>0</prev_value>
            <cmt_value></cmt_value>
            <disp_id></disp_id>
            <button_id></button_id>
          </diff_info>
        </common_setting_c>
      </common_settings>
    </device_settings>
  </diff>
</del_settings>

<changed_settings>
  <diff>
    <device_settings>
      <copy_settings>
        <copy_setting_a>
          <diff_info>
            <prev_value>0</prev_value>
            <cmt_value>1</cmt_value>
            <disp_id>792</disp_id>
            <button_id>5</button_id>
          </diff_info>
        </copy_setting_a>
      </copy_settings>
    </device_settings>
  </diff>
</changed_settings>
```

FIG.9

- 901 — HISTORY ID=xxx
- 902 — DATE AND TIME=yyyy/mm/dd HH:MM
- 903 — BEFORE UPDATE ver=xx.xx
- 904 — AFTER UPDATE ver=xx.xx
- 905 — UPDATE RESULT ver=xx
- 906 — SETTING VALUE DIFFERENCE INFORMATION FILE=setting_diff_xxx.xml

IMAGE FORMING APPARATUS, CONTROL METHOD FOR IMAGE FORMING APPARATUS, AND STORAGE MEDIUM HAVING A FIRMWARE UPDATE FUNCTION

BACKGROUND OF THE INVENTION

1. Field of the Invention

The present invention relates to an image forming apparatus having a firmware update function, a method for controlling the image forming apparatus, and a storage medium.

2. Description of the Related Art

Recent image forming apparatuses, such as a digital multifunction peripheral, can usually have their firmware (a control program) updatable (version upgradable) after purchase in the marketplace.

Since a firmware for update is provided based on various reasons, such as to add a function, change a specification, or to correct a software problem, the same product is often subject to firmware updates. Consequently, Japanese Patent Application Laid-Open No. 2005-50095 discusses an image forming apparatus capable of storing and managing a firmware update history.

In an image forming apparatus, such as a digital multifunction peripheral, a setting value of various device settings (setting items) can be registered, such as an adjustment value of each apparatus, an initial setting relating to print processing like two-sided printing, and a setting relating to an operation specification of each function. However, in some cases, these setting items and setting values are changed at the time of the update.

For example, when performing a firmware update relating to function addition, a setting item relating to the operation specification of the added function is not present in the apparatus before the firmware update. Further, when a range of setting values that can be set for a corresponding setting item is changed based on a specification change, in some cases, the pre-firmware update setting value is automatically corrected to match the range after the specification has been changed, and the corrected setting value is registered as the post-firmware update setting value. If the user does not notice the change in the setting value resulting from the firmware update, the user may use the apparatus with a setting value that he or she does not originally intend.

If the user subsequently notices the change in the setting value resulting from the firmware update, he or she may want to return the setting value to the desired setting. However, in the conventional technology described above, although the user is notified of the firmware update result and the version information, it is not possible to notify the user of changes to the setting value resulting from the firmware update. Further, if the user is not very knowledgeable about the specification of the image forming apparatus, he or she may not know what value the changed setting should be returned to even if he or she tries to return it.

SUMMARY OF THE INVENTION

The present invention is directed to an image forming apparatus enabling a user to confirm information relating to a change in a setting value that is associated with an update history.

According to an aspect of the present invention, an image forming apparatus includes an update unit configured to execute firmware update processing, a storage unit configured to store information relating to a change in a setting value of the image forming apparatus produced by the firmware update processing, a selection unit configured to select a specific update history entry from a firmware update history, and a display unit configured to display information relating to the change in the setting value produced by the firmware update processing corresponding to the specific update history entry selected by the selection unit based on the information stored in the storage unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate an example of device settings in the MFP in a state before a firmware update.

FIGS. 7A and 7B illustrate an example of device settings in the MFP in a state after a firmware update.

FIG. 8, which is composed of FIGS. 8A and 8B, illustrates an example of difference information (XML format) about device settings before and after a firmware update.

FIG. 9 illustrates an example of data elements in a firmware update history.

DESCRIPTION OF THE EMBODIMENTS

Various exemplary embodiments, features, and aspects of the invention will be described in detail below with reference to the drawings.

Figure 1:
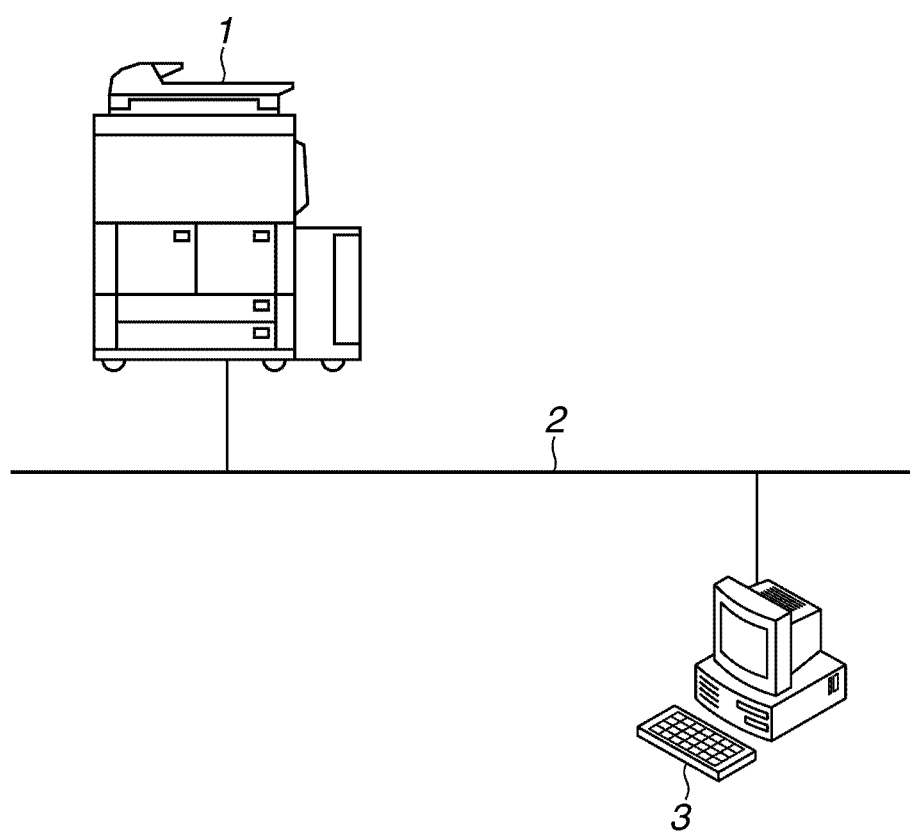
FIG. 1 is a configuration diagram of a system that includes an image forming apparatus according to an exemplary embodiment of the present invention.

FIG. 1 is a system configuration diagram illustrating an image forming apparatus according to an exemplary embodiment of the present invention.

In FIG. 1, a multifunction peripheral (MFP) 1, which is an image forming apparatus according to the present exemplary embodiment, includes functions such as copy, scan, print, send (image data transmission), and receive (image data reception). The MFP 1 is connected to a distribution server 3 via a network 2.

The network 2 is configured by, for example, Ethernet. The distribution server 3 stores update firmware for at least one or more models of image forming apparatus. When update firmware is registered, the distribution server 3 searches for an update target apparatus, and transmits the update firmware to the relevant apparatus.

The MFP 1 receives the update firmware transmitted from the distribution server 3, and updates its own firmware. Since the MFP 1 and the distribution server 3 communicate using a known network communication protocol called hypertext transfer protocol (HTTP) and simple object access protocol (SOAP), a detailed description of the communication procedure will be omitted.

A hardware configuration of the image forming apparatus according to the exemplary embodiment of the present invention will now be described with reference to FIG. 2.

Figure 2:
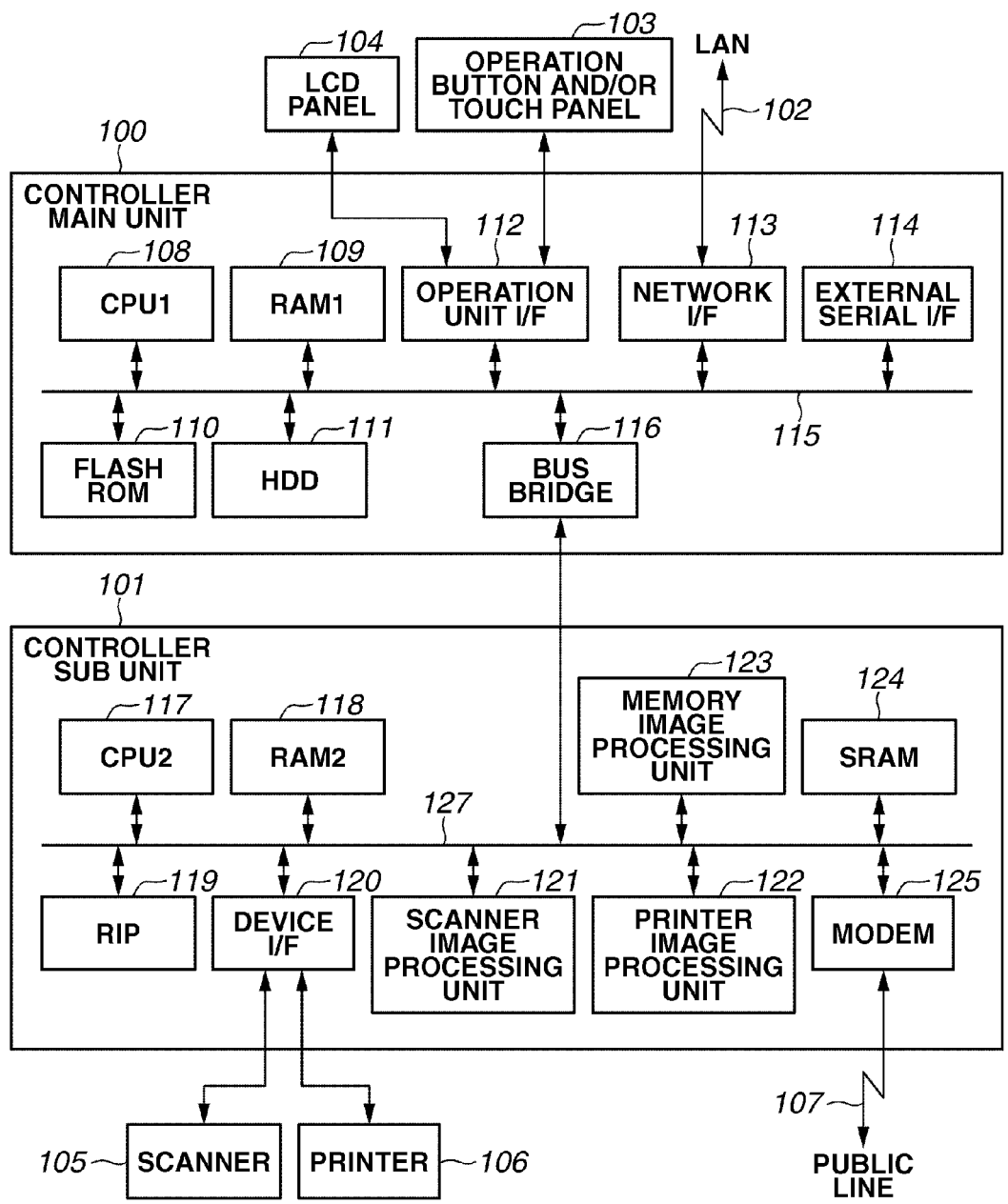
FIG. 2 is a block diagram illustrating an example of a hardware configuration of a multifunction peripheral (MFP).

FIG. 2 is a block diagram illustrating an example of a hardware configuration of the MFP 1.

In FIG. 2, a main controller (a controller main unit) 100 controls an information processing unit in the MFP 1. A sub-controller (a controller sub-unit) 101 controls an image processing unit in the MFP 1. The main controller 100 and the sub-controller 101 are connected between their buses via a bus bridge 116.

First, the components of the main controller 100 will be described.

In the main controller 100, a central processing unit (CPU) 1 (hereinafter, a "CPU 108") performs overall control of the respective devices connected to a system bus 115. The CPU 108 executes a control program (firmware) stored in a flash read-only memory (ROM) 110 or a hard disk drive (HDD) 111.

The flash ROM 110 and the HDD 111 not only store programs, but are also used as a storage area for image data, device settings relating to the operation specification of various functions, and various types of history data. A random access memory 1 (RAM) (hereinafter, a "RAM 109") functions as a main memory and a work area for the CPU 108.

An operation unit interface (I/F) 112 displays operation screens and apparatus status screens, for example, that relate to various functions on a liquid crystal display (LCD) panel 104. An operation button and/or touch panel 103 are also connected to the operation unit I/F 112. The operation button and/or the touch panel 103 are formed integrally with the LCD panel 104, and control the input of instructions by the operator.

A network interface unit (a network I/F) 113 exchanges data via a local area network (LAN) 102 in both directions between other network devices and the distribution server 3 illustrated in FIG. 1.

An external serial interface unit (an external serial I/F) 114 is, for example, a universal serial bus (USB) that connects to and bidirectionally exchanges data with external devices, such as a memory media reader or an integrated chip (IC) card reader. Next, the components of the sub-controller 101 will be described.

A printer 106 is a unit that is realized by an electrophotographic method or an inkjet method, for example, for printing onto a print medium. A scanner 105 is an image reading unit for reading an image printed on a document medium. Frequently, the scanner 105, on which a (not illustrated) auto document feeder is optionally mounted, is capable of automatically reading a plurality of documents. The printer 106 and the scanner 105 transmit and receive control signals to and from a CPU 2 (hereinafter, a "CPU 117") via a device interface (a device I/F) 120.

The CPU 117 performs overall control of the respective devices connected to a system bus 127. An image input from the scanner 105 is input to a RAM 2 (hereinafter, a "RAM 118") via a scanner image processing unit 121 as a read image.

A memory image processing unit 123 performs predetermined image processing on the read image in the RAM 118, and outputs the processed image to the RAM 118. Examples of the image processing performed by the memory image processing unit 123 include rotation, scaling, color space conversion, gray scale conversion, combination, encoding, decoding and the like.

After the image in the RAM 118 is processed by the memory image processing unit 123, the CPU 117 stores the processed image in a storage device (the flash ROM 110 or HDD 111) on the main controller 100 via the bus bridge 116.

Further, the CPU 117 reads the image stored in the storage device (the flash ROM 110 or HDD 111) on the main controller 100 into the RAM 118 via the bus bridge 116, and outputs the read image to the printer 106 via a printer image processing unit 122. Examples of the image processing performed by the scanner image processing unit 121 and the printer image processing unit 122 include color space conversion, movement, color adjustment, density control, and delay amount control.

A raster image processor (RIP) 119 rasterizes a page description language (PDL) code on the RAM 118 into a bitmap image, and outputs the rasterized data to the RAM 118. A static RAM (SRAM) 124 inputs and outputs non-volatile data at high speed to and from the CPU 117. A modem 125, which is connected to a public line 107, performs the modulation and demodulation relating to facsimile image inputs and outputs.

The control programs (firmware) executed by the CPU 108 and the CPU 117 are configured from at least two or more modules. A firmware update can be performed on each module.

A software configuration of the image forming apparatus according to the present exemplary embodiment will now be described with reference to FIG. 3.

Figure 3:
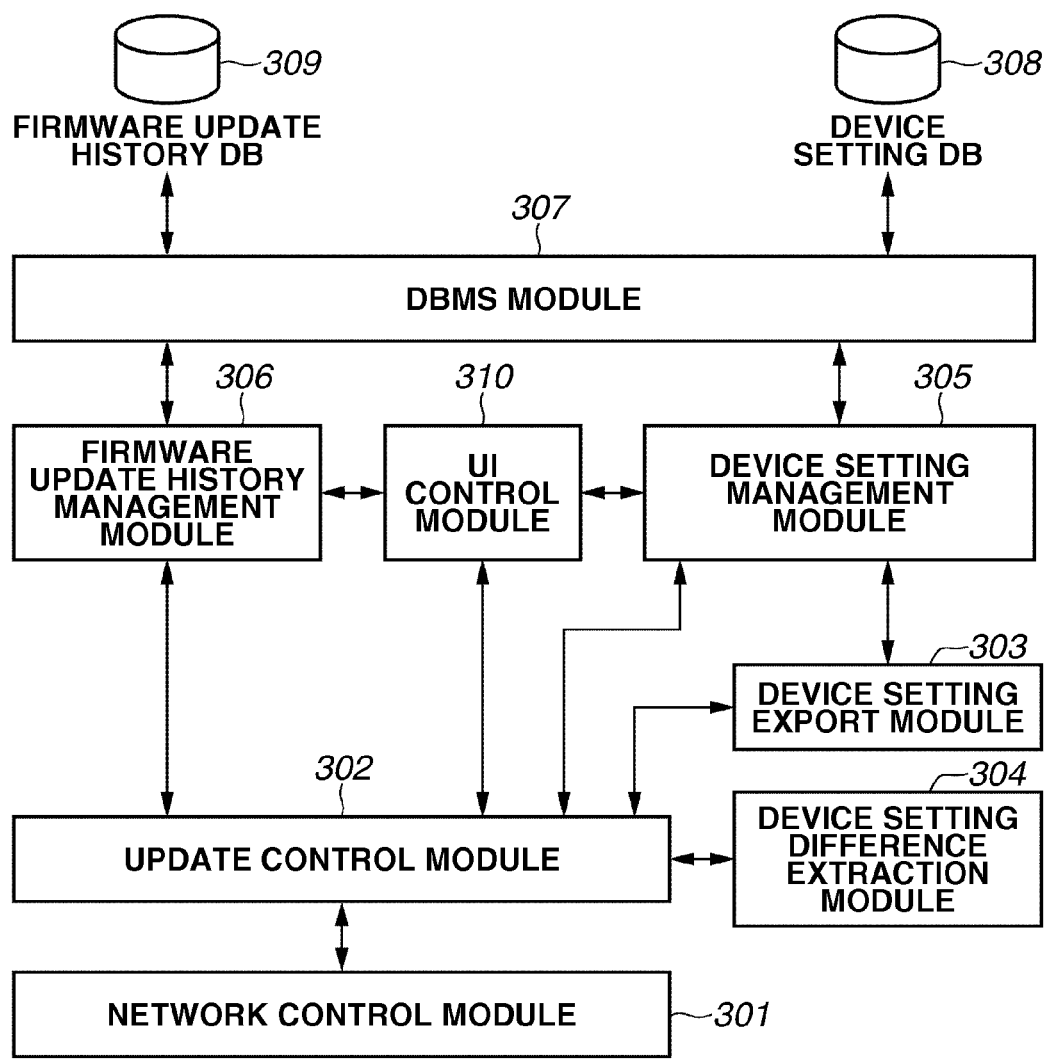
FIG. 3 is a software block diagram illustrating an example of a software configuration of the MFP.

FIG. 3 is a software block diagram illustrating an example of a software configuration of the MFP 1. Although the firmware of the MFP 1 includes software blocks other than those illustrated in FIG. 3, modules not having a direct relationship with the configuration according to the present invention are not illustrated.

In FIG. 3, a network control module 301 is a module for realizing network communication. The network control module 301 controls the network interface 113, and also performs data input and output based on software-based communication control that is based on various communication protocols. In the present exemplary embodiment, the network control module 301 controls communication with the distribution server 3, and performs reception processing of the update firmware.

An update control module 302 is a module for controlling update processing of the firmware in the MFP 1, which is stored in the flash ROM 110 or the HDD 111 using the above-described update firmware.

A device setting export module 303 is a module that, based on an instruction from the update control module 302, reads all of the various setting values before and after the firmware update, and converts the read setting values into an extensible markup language (XML) format.

A device setting difference extraction module 304 is a module that, based on an instruction from the update control module 302, performs difference extraction of the device setting values before and after the firmware update based on information (a device setting value (XML format) before and after the firmware update) acquired by the device setting export module 303.

A device setting management module 305, which is a module that controls the registration and reading processing of each setting value of the MFP 1, is configured so that access to each setting value is performed via this module.

A firmware update history management module 306, which is a module that controls the registration and reading processing of the update history of firmware in the MFP 1, is configured so that access to the firmware update history is performed via this module.

The various device setting values of the MFP 1 and the firmware update history are stored in the flash ROM 110 or the HDD 111 illustrated in FIG. 2 as a device setting database (DB) 308 and a firmware update history DB 309. The device setting DB 308 and the firmware update history DB 309 are managed by a database management system (DBMS) module 307.

A user interface (UI) control module 310, which controls a user interface, is a module that acts as an intermediary with the device when the operator performs various operations or settings. The UI control module 310 issues a processing request or performs data settings by transferring input information to the relevant module based on an operation by the operator via the operation button and/or touch panel 103.

Thus, the software modules illustrated in FIG. 3 correspond to the functions realized by the CPU 108 executing a control program stored in the flash ROM 110 or the HDD 111 of the main controller 100 in the MFP 1.

Next, a series of processes relating to a firmware update of the image forming apparatus according to the present exemplary embodiment will now be described with reference to FIGS. 4 to 9.

Figure 4:
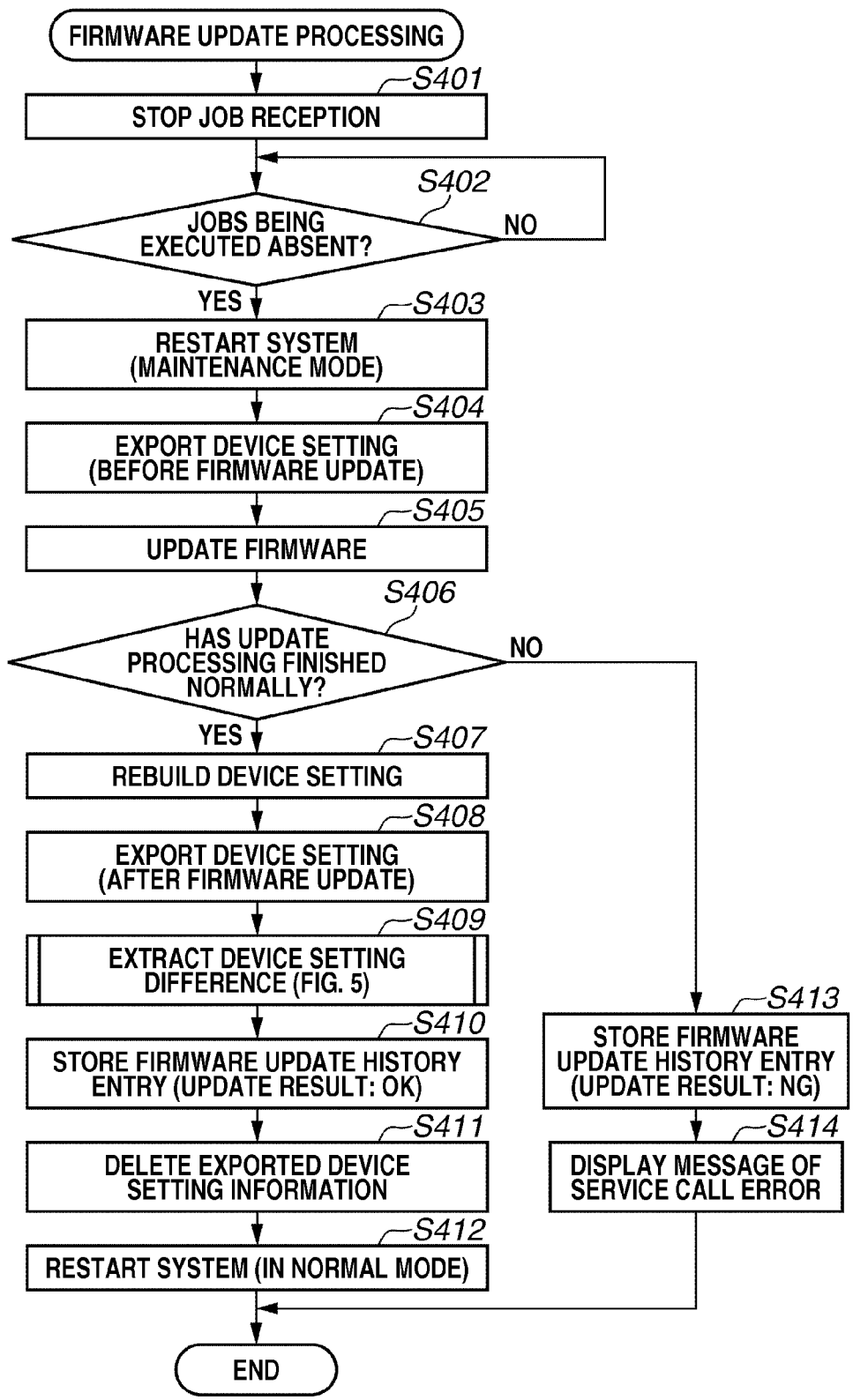
FIG. 4 is a flowchart illustrating an example of a series of processes relating to a firmware update of the image forming apparatus according to the exemplary embodiment.
Figure 5:
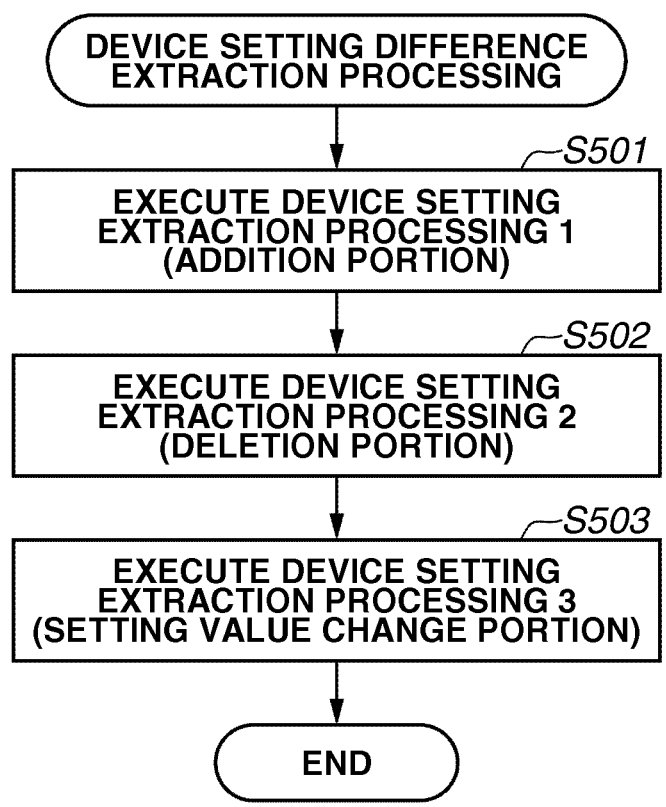
FIG. 5 is a flowchart illustrating device setting difference extraction processing performed before and after the firmware update described in step S409 of FIG. 4.
Figure 10:
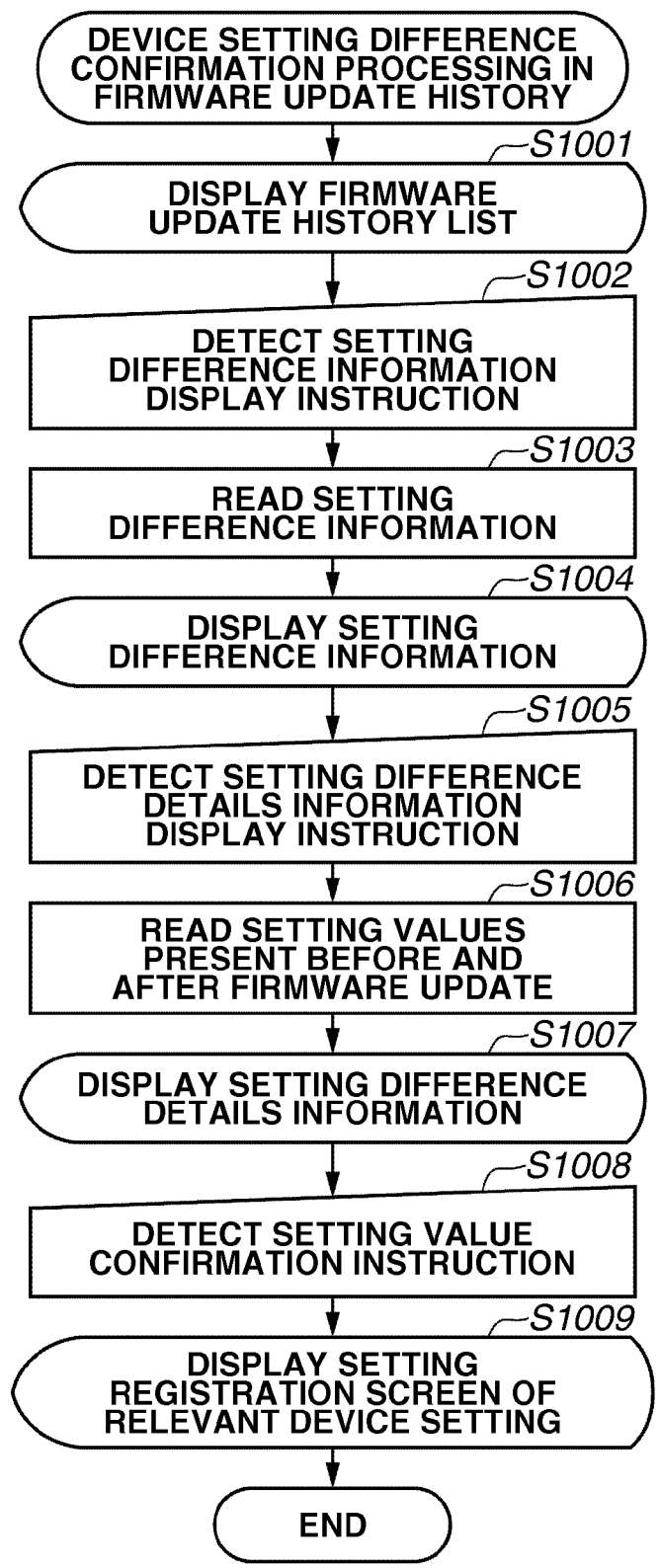
FIG. 10 is a flowchart illustrating an example of a procedure for referring to device setting difference information relating to a firmware update in the image forming apparatus according to the exemplary embodiment.

FIG. 4 is a flowchart illustrating an example of a series of processes relating to a firmware update of the image forming apparatus according to the present exemplary embodiment. The processing performed in the respective steps illustrated in FIG. 4 is executed by the CPU 108 based on a control program stored in the flash ROM 110 or the HDD 111 of the main controller 100 in the MFP 1. Similarly, the processing performed in the respective steps illustrated in the below-described FIGS. 5 and 10 is also executed by the CPU 108 based on a control program stored in the flash ROM 110 or the HDD 111 of the main controller 100 in the MFP 1.

When update firmware transmitted from the distribution server 3 is received, in step S401, the CPU 108 stops job reception, and the processing then proceeds to step S402.

In step S402, the CPU 108 checks for the absence of jobs being currently executed. If it is determined that there is a job that is currently being executed (NO in step S402), the CPU 108 waits for the job currently being executed to finish.

If it is determined that there are no jobs currently being executed (YES in step S402), the processing proceeds to step S403.

In step S403, to shift the MFP 1 to an operation mode (a maintenance mode) that allows a firmware update, the CPU 108 restarts the overall system, and starts the update control module 302. Consequently, the MFP 1 transitions to a maintenance mode.

Next, in step S404, the CPU 108 reads (acquires) all of the device setting information for a pre- (immediately before) firmware update apparatus state, and stores the read information in the flash ROM 110 or the HDD 111 in XML format (an example is illustrated in FIG. 6B) (first acquisition processing). The device setting items of the MFP 1 are configured as a tree structure having a parent-child relationship having large category, medium category, and small category. Examples of the setting value may include a setting value indicating a default setting for the printing processing, such as ON/OFF of two-sided printing, a setting value relating to the various operation specifications of the MFP 1 and the like.

FIG. 6A illustrates an example of device settings in the MFP 1 in a state before a firmware update.

Further, FIG. 6B illustrates an example in which a list of the device settings of the MFP 1 in the state before a firmware update illustrated in FIG. 6A is described in XML format. In the following description, this pre-firmware update setting value list will be referred to as a first setting value list (first setting information).

Returning now to FIG. 4, next, in step S405, the CPU 108 executes update processing of the firmware in the MFP 1. Then, when the firmware update processing is completed, then in step S406, the CPU 108 determines whether the update processing has finished normally.

If it is determined in step S406 that the firmware update processing has not finished normally (NO in step S406), the processing proceeds to step S413.

In step S413, the CPU 108 creates a firmware update history entry indicating update failure. Then, in step S414, the CPU 108 displays a message on the LCD 104 indicating a service call error, and finishes the series of processes relating to the firmware update.

On the other hand, if it is determined in step S406 that the firmware update processing has finished normally (YES in step S406), the processing proceeds to step S407.

In step S407, the CPU 108 rebuilds the device setting DB 308 based on the updated firmware. Then, in step S408, the CPU 108 reads (acquires) all of the device settings of the MFP 1 for a post- (immediately after) firmware update apparatus state, and stores the read information in the flash ROM 110 or the HDD 111 in XML format (an example is illustrated in FIG. 7B) (second acquisition processing).

FIG. 7A illustrates an example of the device settings of the MFP 1 in a state after a firmware update.

Further, FIG. 7B illustrates an example in which a list of the device settings of the MFP 1 in the state after a firmware update illustrated in FIG. 7A is described in XML format. In the following description, this post-firmware update setting value list will be referred to as a second setting value list (second setting information).

Returning now to FIG. 4, next, in step S409, the CPU 108 extracts a device setting difference in the MFP 1 between setting values present before and after the firmware update based on the first setting value list and the second setting value list, and stores the extracted information in XML format (an example is illustrated in FIG. 8) in the flash ROM 110 or the HDD 111 (extraction processing). Examples of this difference information include a device setting added or deleted by the firmware update, and a device setting in which a setting value has been changed by the firmware update. Further, information about an identifier (a screen ID, button ID) for displaying a setting screen corresponding to each setting item on the LCD panel 104 is also stored on setting item basis. The difference extraction method of the device setting will be described below in detail with reference to FIG. 5.

FIG. 8, which is composed of FIGS. 8A and 8B, illustrates an example of difference information (XML format) about the device settings before and after a firmware update.

In FIG. 8, the information enclosed by the "add_settings" tag indicates a device setting added by the firmware update. The information enclosed by the "del_settings" tag indicates a device setting deleted by the firmware update. The information enclosed by the "changed_settings" tag indicates a device setting in which the setting value has been changed by the firmware update.

Further, the "prev_value" tag indicates a pre-firmware update setting value, and the "crnt_value" tag indicates a post-firmware update setting value. Further, the "disp_id" tag and the "button_id" tag indicate an identifier (a screen ID, button ID) for displaying a setting registration screen of the relevant setting item in the MFP 1 after the firmware update.

Returning now to FIG. 4, next, in step S410, the CPU 108 creates a firmware update history entry indicating a successful update, and stores this entry in the firmware update history DB 309.

FIG. 9 illustrates an example of data elements in a firmware update history.

As illustrated in FIG. 9, the firmware update history includes, for example, a history identification number (a history ID) 901, an update date and time 902, a pre-update firmware version 903, a post-update firmware version 904, an update result 905, and an update-related device setting difference information filename 906 (only when update finishes normally). The device setting difference information file name 906 refers to the device setting difference information file extracted and stored in step S409.

The firmware update history created in this step can be referred to on the LCD panel 104 by the user operating the operation button and/or touch panel 103. The method for referring to the firmware update history will be described in detail below.

Returning now to FIG. 4, next, in step S411, the CPU 108 deletes the first setting value list and the second setting value list created in steps S404 and S408, respectively.

Then, in step S412, to shift the MFP 1 to a normal operation mode, the CPU 108 restarts the overall system in a normal mode, and finishes the series of processes relating to a firmware update.

FIG. 5 is a flowchart illustrating device setting difference extraction processing performed before and after the firmware update described in step S409 of FIG. 4.

First, in step S501, the CPU 108 executes a first device setting extraction process to extract device settings added by the firmware update. Specifically, the CPU 108 compares the first setting value list (e.g., FIG. 6A) indicating a pre-firmware update device setting state and the second setting value list (e.g., FIG. 7A) indicating a post-firmware update device setting state, and extracts the device settings that are included only in the second setting value list (added setting extraction processing). For example, information with the portion enclosed by the "add_settings" tag in FIG. 8 may be extracted.

Next, in step S502, the CPU 108 executes a second device setting extraction process to extract device settings deleted by the firmware update. Specifically, similar to step S501, the CPU 108 compares the first setting value list and the second setting value list, and extracts the device settings that are included only in the first setting value list (deleted setting extraction processing). For example, information with the portion enclosed by the "del_settings" tag in FIG. 8 may be extracted.

In step S503, the CPU 108 executes a third device setting extraction process to extract device settings having a setting value that has been changed by the firmware update. Specifically, similar to steps S501 and S502, the CPU 108 compares the first setting value list and the second setting value list, and extracts the device settings that are included in both lists and have a different setting value (changed setting extraction processing). For example, information with the portion enclosed by the "changed_settings" tag in FIG. 8 may be extracted.

The above-described processing can realize the difference extraction of the device settings relating to a firmware update of the MFP 1 and the link between the extracted device setting difference information and the firmware update history.

Next, a procedure for referring to the device setting difference information relating to the firmware update in the image forming apparatus according to the present exemplary embodiment will be described with reference to FIG. 10 to FIGS. 13A and 13B.

FIG. 10 is a flowchart illustrating an example of a procedure for referring to device setting difference information relating to a firmware update in the image forming apparatus according to the present exemplary embodiment.

When an instruction to display the firmware update history has been made by the operator via the operation button and/or touch panel 103 in the MFP 1, the CPU 108 starts the processing performed in this flowchart.

Figure 11A:
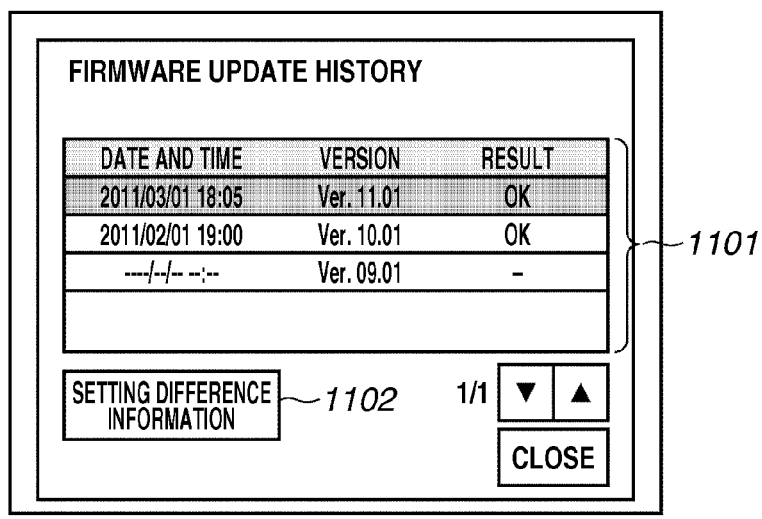
FIGS. 11A, 11B, and 11C each illustrate an example of screens for referring to device setting difference information relating to a firmware update.

In step S1001, the CPU 108 reads the firmware update history (FIG. 9) stored in the firmware update history DB 309, and, as illustrated in FIG. 11A, displays a firmware update history list on the LCD panel 104.

FIG. 11A illustrates an example of a firmware update history screen in the MFP 1. The CPU 108 performs control so that an instruction by the user is received from this firmware update history screen.

As illustrated in FIG. 11A, a history of the firmware updates performed on the MFP 1 until now is displayed as a list in a display area 1101.

When the operator selects an arbitrary history entry, and instructs that the setting difference information be displayed by pressing a setting difference information button 1102, then in step S1002, the CPU 108 detects this setting difference information display instruction, and the processing proceeds to step S1003.

In step S1003, the CPU 108 reads the device setting difference information (the setting value difference information file name 906 in FIG. 9) linked to the history entry selected in step S1002. Then, in step S1004, as illustrated in FIG. 11B, the CPU 108 displays the setting difference information on the LCD panel 104.

Figure 11B:
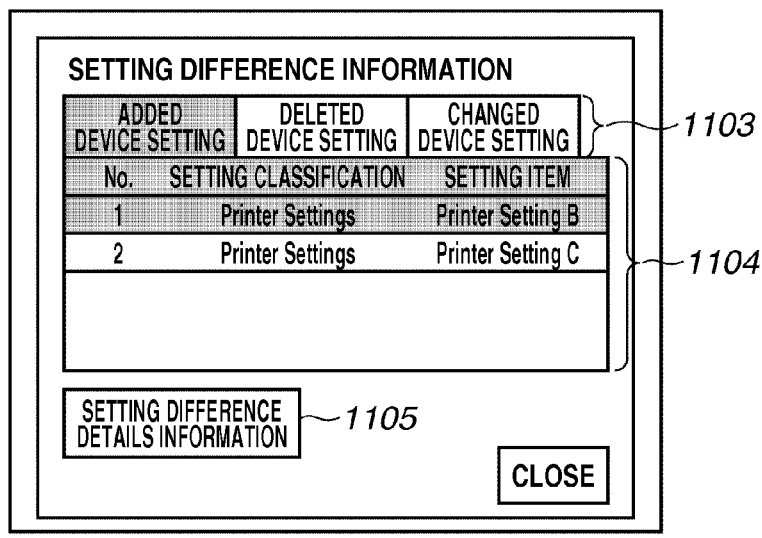

FIG. 11B illustrates an example of the setting difference information screen in the MFP 1. The CPU 108 performs control so that an instruction by the user is received from this setting difference information screen.

FIG. 11B illustrates a tab 1103 for switching the type of difference to be displayed, which can be used to select and display one of a device setting added by a firmware update, a device setting deleted by a firmware update, and a device setting having a setting value that has been changed by a firmware update. Based on the display of FIG. 11B, the operator can confirm the setting item in the MFP 1 (the added setting item, deleted setting item, or setting item having a changed setting value) in which a difference has been produced by the firmware update, corresponding to the update history entry selected in FIG. 11A.

Even if the user notices that there has been some kind of change in the setting value, if the user is not very knowledgeable about the specification of the MFP 1, he or she may not know how to change the setting value. In such a case, if the user knows that the MFP 1 was operating as intended a week ago, the user can confirm the setting value at the time when the MFP 1 was operating as intended by confirming the update history of the firmware a week ago or thereabouts.

A list of device settings applicable to the difference type selected from the tab 1103 is displayed in a display area 1104. In FIG. 11B, as an example, a list of "added device settings" added by the firmware update is displayed.

When the operator selects an arbitrary device setting from the display area 1104, and issues an instruction to display the setting difference details information by pressing a setting difference details information button 1105, then in step S1005, the CPU 108 detects this setting difference details information display instruction, and the processing proceeds to step S1006.

In step S1006, the CPU 108 reads the setting values present before and after the firmware update from the device setting difference information selected in step S1005. Then, in step S1007, as illustrated in FIG. 11C, the CPU 108 displays the setting difference details information screen relating to this device setting on the LCD panel 104.

Figure 11C:
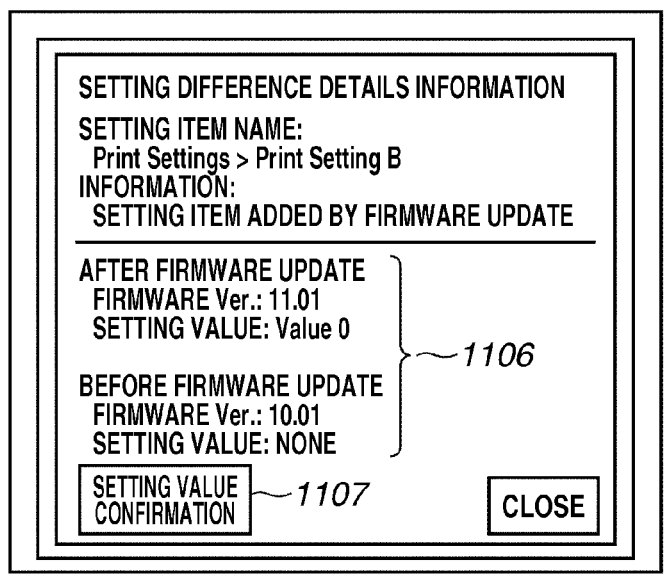

FIG. 11C illustrates an example of the setting difference details information screen in the MFP 1. The CPU 108 performs control so that an instruction by the user is received from this setting difference details information screen.

In FIG. 11C, the respective setting values of the relevant device setting present before and after a firmware update are displayed in a display area 1106. Based on the display of FIG. 11C, the operator can confirm the setting values of the setting item selected in FIG. 11B from among the setting items of the MFP 1 in which a difference has been produced by the firmware update corresponding to the update history entry selected in FIG. 11A.

In FIG. 11C, as an example, detailed information relating to the device setting added by the firmware update is displayed. Further, in FIG. 11C, a setting value confirmation button 1107 is arranged as a shortcut button to a setting registration screen for the relevant device setting.

When the operator issues an instruction to confirm the setting value by pressing the setting value confirmation button 1107, then in step S1008, the CPU 108 detects this setting value confirmation instruction, and the processing proceeds to step S1009.

Figure 13A:
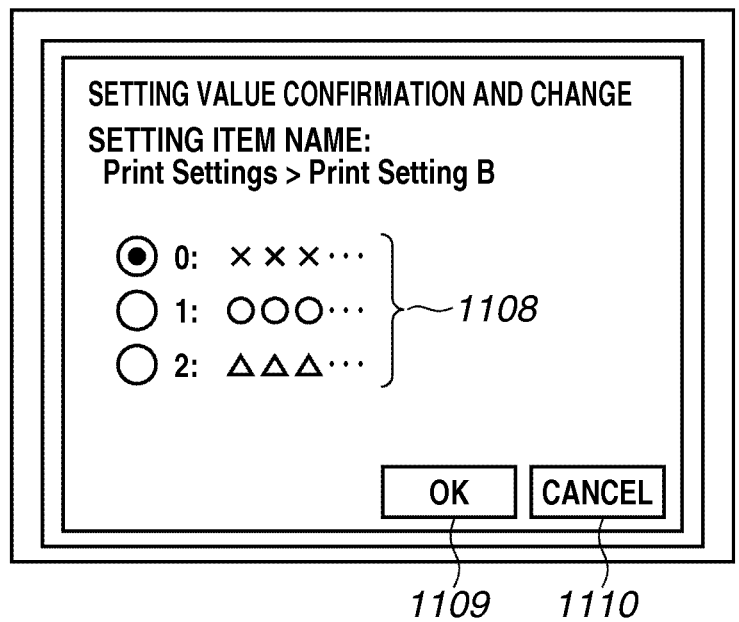
FIGS. 13A and 13B illustrate examples of setting value confirmation change screens in the MFP.

In step S1009, the CPU 108 displays the setting registration screen like that in FIG. 13A using the identification information on the setting registration screen for the device setting (i.e., the device setting selected in step S1005) displayed on the setting difference details information screen illustrated in FIG. 11C. In this case, the operator can also confirm the currently set setting value, as well as change the setting.

FIG. 13A illustrates an example of a setting value confirmation change screen in the MFP 1. The CPU 108 performs control so that an instruction by the user is received from this setting value confirmation change screen.

In FIG. 13A, a controller for setting the setting value of the relevant device setting is displayed in a display area 1108. In FIG. 13A, as an example, a radio button is displayed for selecting the setting value of a "Print Setting B" setting.

When the operator issues an instruction to apply the setting value by selecting a setting value in the display area 1108 and pressing the OK button 1109, the CPU 108 detects this setting value application instruction, and changes the setting value of the relevant device setting.

Further, if the operator presses a cancel button 1110, the CPU 108 closes the setting value confirmation change screen without changing the setting value of the relevant device setting.

Figure 12A:
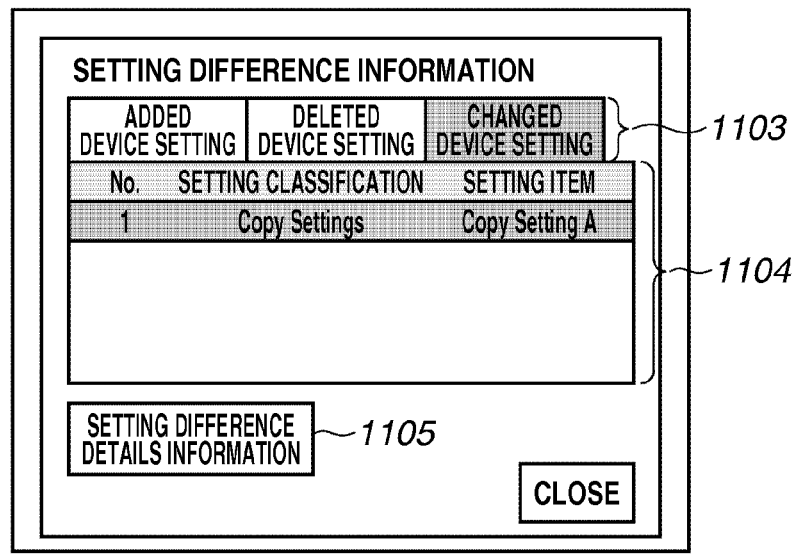
FIGS. 12A and 12B each illustrate another example of screens for referring to device setting difference information relating to a firmware update.

FIG. 12A illustrates another example of a setting difference information screen in the MFP 1. FIG. 12A corresponds to an example of a screen display when, on the above-described setting difference information screen illustrated in FIG. 11B, the "device setting having a changed setting value" is selected from the tab 1103, and an instruction to display the "device setting having a changed setting value" that has been changed by a firmware update is issued. In FIG. 12A, parts that are the same as in FIG. 11B are denoted by the same reference numerals.

Figure 12B:
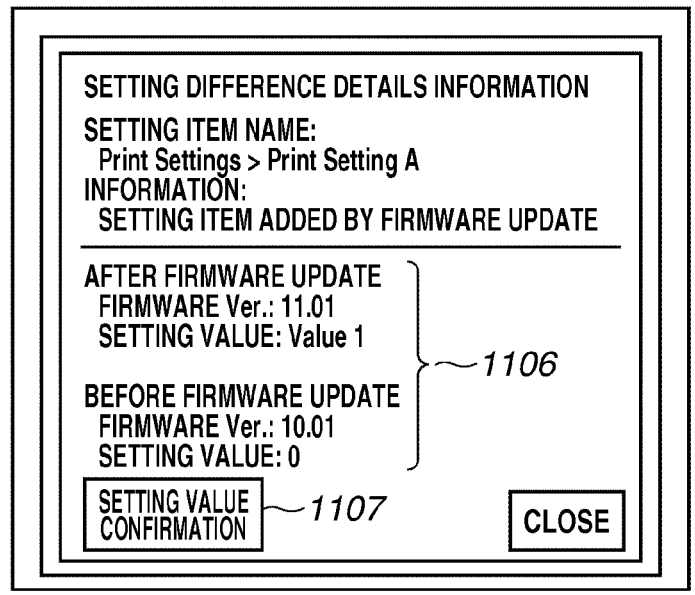

Further, FIG. 12B illustrates another example of a setting difference details information screen in the MFP 1. FIG. 12B corresponds to an example of a setting difference details information screen displayed when the setting difference details information button 1105 is pressed on the display screen illustrated in FIG. 12A. In FIG. 12B, parts that are the same as in FIG. 11C are denoted by the same reference numerals.

In this case too, by pressing the setting value confirmation button 1107, the setting registration screen corresponding to the relevant device setting is displayed, which enables the operator to confirm the currently set setting value and change the setting.

Figure 13B:
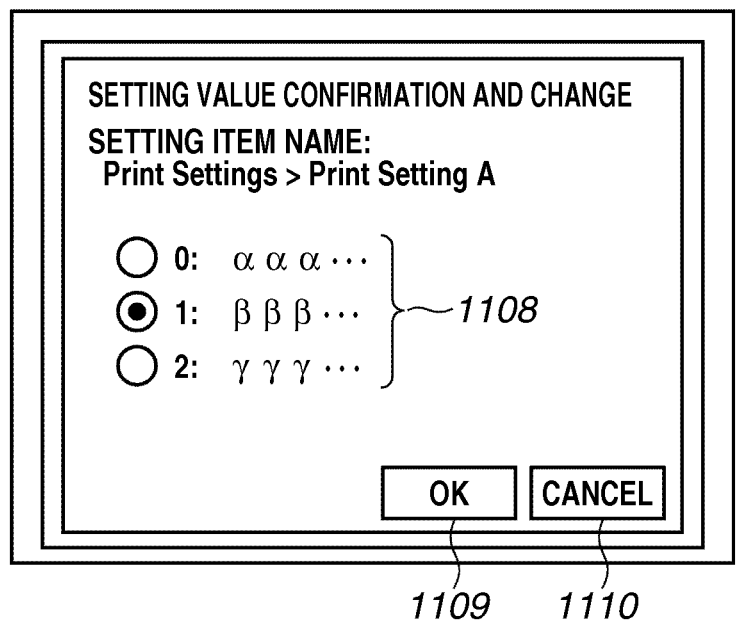

FIG. 13B illustrates another example of a setting value confirmation change screen in the MFP 1. FIG. 13B corresponds to an example of a setting value confirmation change screen displayed when the setting value confirmation button 1107 is pressed on the display screen illustrated in FIG. 12B. In FIG. 13B, parts that are the same as in FIG. 13A are denoted by the same reference numerals.

In this case, when the operator issues an instruction to apply the setting value by selecting a setting value of "Copy Setting A" and pressing the OK button 1109 in the display area 1108, the CPU 108 detects this setting value application instruction, and changes the setting value of "Copy Setting A".

As described in detail above, according to the present exemplary embodiment, an image forming apparatus can automatically (without a deliberate operation by the user) extract a difference, link that difference with a firmware update history entry, and store that information even when a difference has occurred in a device setting of the image forming apparatus before and after an update relating to a firmware update. Consequently, with the firmware update history entry acting as an origin, the user can confirm detailed information about the difference in the device setting relating to that update via an operation unit.

Further, a setting registration screen corresponding to the relevant device setting can be displayed on an operation unit by using (touching) identification information on a setting registration screen for each device setting in which a difference has occurred that is provided on the detailed information confirmation screen. Consequently, without the user having to perform the troublesome operation of opening the setting registration screen for that device setting by tracking back a parent-child relationship from large category, medium category, and to small category from the top screen, and confirming that device setting, a setting value confirmation change screen can be displayed based on a simple procedure (just by touching the button 1107 in FIG. 11C). In addition, this also enables the user easily to confirm the currently set setting value and change a setting.

Therefore, the operability in confirming differences produced during a device setting in an image forming apparatus and changing the setting value due to a firmware update is substantially improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-019898 filed Feb. 1, 2012, which is hereby incorporated by reference herein in its entirety.

What is claimed is:

1. An image forming apparatus capable of performing printing comprising:
    an update unit configured to execute firmware update processing;
    a generating unit configured to generate, in a case where the update unit executes the firmware update processing, setting difference information indicating a setting item added by the firmware update processing, a setting item deleted by the firmware update processing, a setting value of a setting item, which is changed by the firmware update processing, before the firmware update processing, and a setting value of the setting item, which is changed by the firmware update processing, after firmware update processing;
    a storage unit configured to store the setting difference information generated by the generating unit in association with an update history;
    a display unit configured to display a firmware update processing history screen; and
    a determining unit configured to determine whether the firmware update processing has been successfully executed,
    wherein, in a case where a user selects a specific update history from among a plurality of update histories in the firmware update processing history screen, the display unit displays, based on the setting difference information corresponding to the specific update history, a setting item added by the firmware update processing indicated by the specific update history, a setting item deleted by the firmware update processing indicated by the specific update history, a setting value of a setting item, which is changed by the firmware update processing indicated by the specific update history, before the firmware update processing, and a setting value of the setting item, which is changed by the firmware update processing indicated by the specific update history, after firmware update processing,
    wherein, in a case where the determining unit determines that the firmware update processing has been successfully executed, the generating unit generates the setting difference information, and
    wherein, in a case where the determining unit determines that the firmware update processing has not been successfully executed, the generating unit creates a firmware update history entry indicating update failure and the display unit displays an error message.

2. A method for controlling an image forming apparatus capable of performing printing, the method comprising:
    executing firmware update processing;
    generating, in a case where executing step executes the firmware update processing, setting difference information indicating a setting item added by the firmware update processing, a setting item deleted by the firmware update processing, a setting value of a setting item, which is changed by the firmware update processing, before the firmware update processing, and a setting value of the setting item, which is changed by the firmware update processing, after firmware update processing;
    storing the setting difference information generated by the generating step in association with an update history;
    displaying a firmware update processing history screen; and
    determining whether the firmware update processing has been successfully executed,
    wherein, in a case where a user selects a specific update history from among a plurality of update histories in the firmware update processing history screen, the displaying step, based on the setting difference information corresponding to the specific update history, a setting item added by the firmware update processing indicated by the specific update history, a setting item deleted by the firmware update processing indicated by the specific update history, a setting value of a setting item, which is changed by the firmware update processing indicated by the specific update history, before the firmware update processing, and a setting value of the setting item, which is changed by the firmware update processing indicated by the specific update history, after firmware update processing,
    wherein, in a case where the determining unit determines that the firmware update processing has been successfully executed, the generating unit generates the setting difference information, and
    wherein, in a case where the determining unit determines that the firmware update processing has not been successfully executed, the generating unit creates a firmware update history entry indicating update failure and the display unit displays an error message.

3. A non-transitory computer-readable storage medium storing a program that causes a computer to execute the method according to claim 2.

4. The image forming apparatus according to claim 1, wherein, in the case where the user selects the specific update history from among the plurality of update histories in the firmware update processing history screen, the display unit displays a setting difference screen including a first tab for displaying the setting item added by the firmware update processing indicated by the specific update history, a second tab for displaying the setting item deleted by the firmware update processing indicated by the specific update history, and a third tab for displaying the setting item changed by the firmware update processing indicated by the specific update history, and in the setting difference screen, a setting item added by the firmware update processing indicated by the specific update history, a setting item deleted by the firmware update processing indicated by the specific update history, a setting value of a setting item, which is changed by the firmware update processing indicated by the specific update history, before the firmware update processing, and a setting value of the setting item, which is changed by the firmware update processing indicated by the specific update history, after firmware update processing are displayed.

5. The image forming apparatus according to claim 4, wherein, in the setting difference screen, a change object for returning a setting value of a setting item changed by the firmware update processing to a setting value before the firmware update processing is displayed.

6. The image forming apparatus according to claim 1, wherein, in the firmware update processing history screen, a time and date when the firmware update processing is executed is displayed.

7. The image forming apparatus according to claim 1, wherein the setting difference information generated by the generating unit is in XML format.

\* \* \* \* \*